US008233915B2

(12) United States Patent
Paulson et al.

(10) Patent No.: US 8,233,915 B2
(45) Date of Patent: *Jul. 31, 2012

(54) UPDATING POSITION ASSIST DATA ON A MOBILE COMPUTING DEVICE

(75) Inventors: Janell Paulson, Carlsbad, CA (US); Isabel Ge Mahe, Los Altos, CA (US); Craig C. Hamilton, Sunnyvale, CA (US); Sachin S. Kansal, Sunnyvale, CA (US); Gurunath Ramaswamy, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,435

(22) Filed: Oct. 3, 2011

(65) Prior Publication Data

US 2012/0021767 A1 Jan. 26, 2012

Related U.S. Application Data

(63) Continuation of application No. 11/729,966, filed on Mar. 29, 2007, now Pat. No. 8,032,151.

(51) Int. Cl.
*H04W 24/00* (2009.01)

(52) U.S. Cl. ............... 455/456.1; 455/561; 455/574; 455/455; 370/311

(58) Field of Classification Search .......... 455/456, 455/100, 404, 414, 433, 450, 456.1; 607/61; 414/921; 251/121; 297/85
See application file for complete search history.

(56) References Cited

U.S. PATENT DOCUMENTS

| 5,365,450 | A | 11/1994 | Schuchman et al. |
| 5,422,813 | A | 6/1995 | Schuchman et al. |
| 5,726,893 | A | 3/1998 | Schuchman et al. |
| 5,731,788 | A | 3/1998 | Reeds |
| 6,622,020 | B1 | 9/2003 | Seki |
| 7,076,256 | B1 * | 7/2006 | Orler et al. ............... 455/456.1 |
| 7,605,752 | B2 * | 10/2009 | Angus ..................... 342/357.72 |
| 7,685,606 | B2 * | 3/2010 | Chang ........................ 719/318 |
| 7,999,734 | B2 * | 8/2011 | Morgan .................. 342/357.75 |
| 2001/0016500 | A1 | 8/2001 | Son et al. |
| 2002/0168976 | A1 | 11/2002 | Krishnan |
| 2003/0028318 | A1 | 2/2003 | Kaji et al. |
| 2003/0125045 | A1 | 7/2003 | Riley et al. |
| 2004/0008660 | A1 | 1/2004 | Lee |
| 2004/0198449 | A1 * | 10/2004 | Forrester et al. ............. 455/561 |
| 2005/0033515 | A1 | 2/2005 | Bozzone |
| 2006/0038719 | A1 | 2/2006 | Pande et al. |
| 2007/0030841 | A1 | 2/2007 | Lee et al. |
| 2007/0050128 | A1 | 3/2007 | Lee et al. |

(Continued)

FOREIGN PATENT DOCUMENTS

KR 102006115099 11/2006

(Continued)

*Primary Examiner* — Jean Gelin
*Assistant Examiner* — Mahendra Patel

(57) ABSTRACT

A mobile computing device comprises a memory, a processor and a transceiver. The memory is configured to store at least one type of position assist data. The processor is configured to provide a position fix based on the position assist data. The transceiver is configured for wireless communication. The memory is configured to store updated position assist data for the type of position assist data. The processor is operable in a first operating mode in which the type of position assist data is not updated and operable in a second operating mode in which the type of position assist data is updated in response to at least one triggering event.

16 Claims, 9 Drawing Sheets

U.S. PATENT DOCUMENTS

| | | |
|---|---|---|
| 2007/0054696 A1 | 3/2007 | Cooner et al. |
| 2007/0182625 A1 | 8/2007 | Kerai et al. |
| 2008/0147324 A1* | 6/2008 | Garin et al. .................. 701/213 |
| 2009/0239548 A1 | 9/2009 | Spencer et al. |
| 2010/0149030 A1 | 6/2010 | Verma et al. |
| 2011/0102258 A1 | 5/2011 | Underbrink et al. |

FOREIGN PATENT DOCUMENTS

| | | |
|---|---|---|
| KR | 10200868329 | 7/2008 |
| WO | 2008/121707 | 10/2008 |

* cited by examiner

UPDATING POSITION ASSIST DATA ON A MOBILE COMPUTING DEVICE

CROSS REFERENCE TO RELATED APPLICATIONS

The present application is a continuation of and claims the benefit to the, commonly owned U.S. application Ser. No. 11/729,966, filed Mar. 29, 2007, now U.S. Pat. No. 8,032,151, the contents of which hereby incorporated by reference.

BACKGROUND

Some mobile computing devices provide location-based services to a user. For example, a user may use a mobile computing device to report their location to a 9-1-1 emergency service in the event of an emergency. Further, the mobile computing device may use a navigation application to provide directions from the user's current location to a desired destination.

A mobile computing device uses various types of position assist data to assist in the calculation of position fixes for use with the location-based services. Position assist data includes almanac, ephemeris, and coarse data, and may also include mobile-station assist data such as visible satellite data and Doppler data. Almanac data may require updating every 6 months. Ephemeris data may require updating every 30 to 90 minutes, and may need to be updated even more frequently (e.g., every minute or less) if the device is moving, since ephemeris data provides data about the orbital information specific to the satellites within visibility at a particular position. Coarse data may provide a last known position and time to a calculation algorithm to speed up calculation of a subsequent position fix.

If the position assist data is not up-to-date or "fresh," then the device may need to update one or more types of position assist data before it responds to the request for a position fix. Updating position assist data takes time and power, and may take wireless bandwidth. Position assist data may be updated using signals from global positioning system (GPS) satellites, though current approaches take substantial time to download the data.

Accordingly, there is a need for a system and method for maintaining or updating position assist data. Further, there is a need for updating position assist data with reduced time, power and/or wireless bandwidth. Further, there is a need for updating position assist data less often depending on various states of the device and data stored on the device. Further still, there is a need for updating position assist data while minimizing a user's perception of the update. Further still, there is a need for using a wireless network to receive position assist data, which may receive the position assist data faster than other methods and which may provide useful position data. Further still, there is a need for updating position assist data while minimizing the use of network airtime. Further still, there is a need for updating position assist data while minimizing disruptions of other processes or applications running on the device. Further still, there is a need for minimizing or eliminating the need for updates of position assist data made at the time of receiving a position fix request (i.e., "ad hoc" updates). Further still, there is a need for minimizing instances of moving one or more components of a mobile computing device out of a sleep mode.

The teachings herein extend to those embodiments which fall within the scope of the appended claims, regardless of whether they accomplish one or more of the above-mentioned needs.

DETAILED DESCRIPTION OF EXEMPLARY EMBODIMENTS

The disclosure of U.S. patent application Ser. No. 11/469,374 filed Aug. 31, 2006 is incorporated by reference herein in its entirety.

Figure 1:
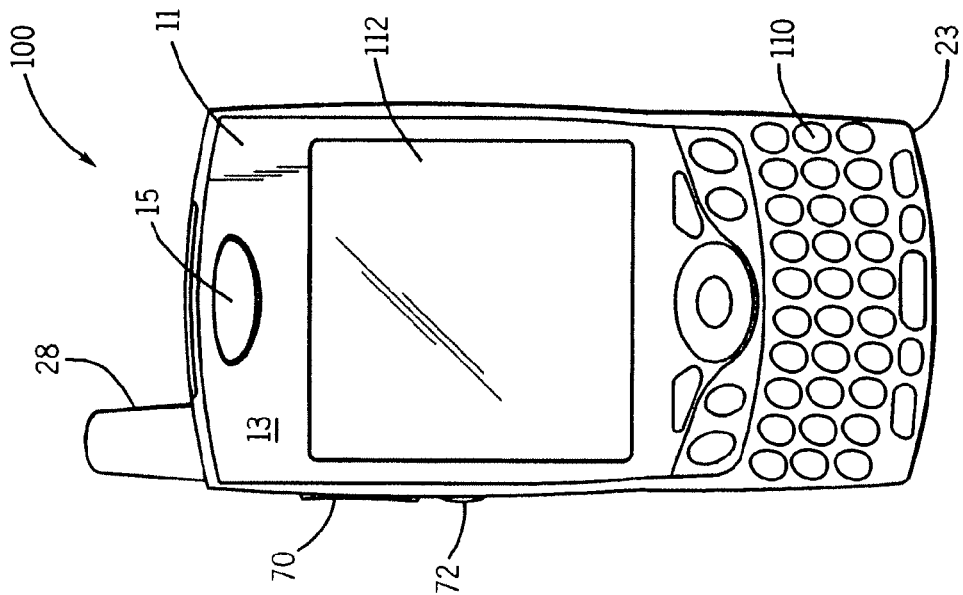
FIG. 1 is a front view of a mobile computing device, according to an exemplary embodiment.

Referring first to FIG. 1, a mobile computing device 100 is shown. Device 100 is a smart phone, which is a combination mobile telephone and handheld computer having personal digital assistant functionality. The teachings herein can be applied to other mobile computing devices (e.g., a laptop computer) or other electronic devices (e.g., a desktop personal computer, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 100 is further configured to receive and operate additional applications provided to device 100 after manufacture, e.g., via wired or wireless download, Secure Digital card, etc.

Figure 2:
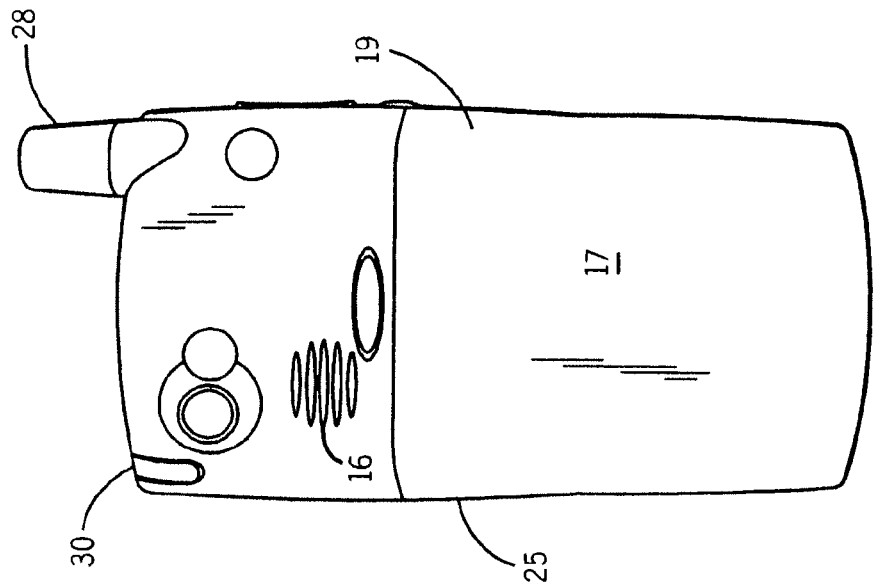
FIG. 2 is a back view of a mobile computing device, according to an exemplary embodiment.

Device 100 comprises a housing 11 having a front side 13 and a back side 17 (FIG. 2). An earpiece speaker 15 may be an electro-acoustic transducer configured to provide audio output with a volume suitable for a user placing earpiece 15 against or near the ear. Loudspeaker 16 may be an electro-acoustic transducer that converts electrical signals into sounds loud enough to be heard at a distance. Loudspeaker 16 can be used for a speakerphone functionality. In alternative embodiments, display 112, user input device 110, earpiece 15 and loudspeaker 16 may each be positioned anywhere on front side 13, back side 17 or the edges there between.

Device 100 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

Device 100 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 100 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 3:
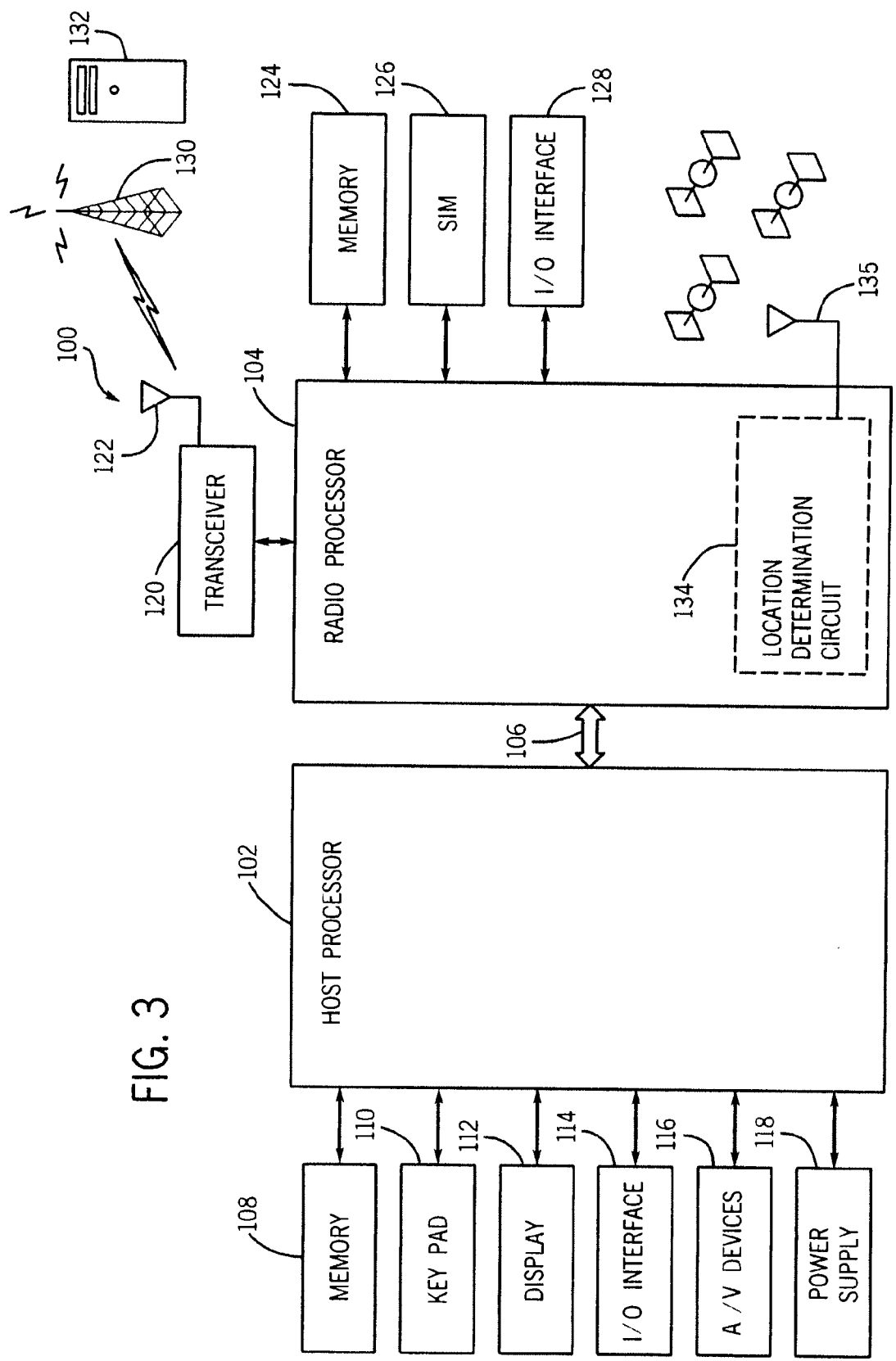
FIG. 3 is a block diagram of the mobile computing device of FIGS. 1 and 2, according to an exemplary embodiment.

As shown in the embodiment of FIG. 3, device 100 may comprise a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise additional processors, may be implemented as a dual- or multi-core chip with both host processor 102 and radio processor 104 on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 100. For example, the host processor 102 may be responsible for executing various software programs such as application programs and system programs to provide computing and processing operations for device 100. Examples of application programs may include, for example, a telephone application, voicemail application, email application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 100 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 100 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 100 may comprise an expansion slot to support a multimedia and/or memory card, for example.

Device 100 may comprise a user input device 110 coupled to the host processor 102. The user input device 110 may comprise, for example, a QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to various audio/video (A/V) devices 116 that support A/V capability of device 100. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 100. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or base band processor. Although some embodiments may be described with the radio processor 104 implemented as a modem processor or base band processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

In various embodiments, the radio processor 104 may perform analog and/or digital base band operations for device 100. For example, the radio processor 104 may perform digital-to-analog conversion (DAC), analog-to-digital conversion (ADC), modulation, demodulation, encoding, decoding, encryption, decryption, and so forth.

Device 100 may comprise a transceiver module 120 coupled to the radio processor 104. The transceiver module 120 may comprise one or more transceivers configured to communicate using different types of protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, and/or CDMA system. The transceiver module 120 also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 100 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 100 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 100 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 100 and one or more external computer systems.

In various embodiments, device 100 may comprise location or position determination capabilities. Device 100 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 100 may be configured to operate in one or more location determination modes including, for example, a standalone mode, a mobile station (MS) assisted mode, and/or a MS-based mode. In a standalone mode, such as a standalone GPS mode, device 100 may be configured to determine its position without receiving wireless navigation data from the network, though it may receive certain types of position assist data, such as almanac, ephemeris, and coarse data. In a standalone mode, device 100 may comprise a local location determination circuit 134 (e.g., a GPS receiver) which may be integrated within housing 11 (FIG. 1) configured to receive satellite data via an antenna 135 and to calculate a position fix. Local location determination circuit may alternatively comprise a GPS receiver in a second housing separate from housing 11 but in the vicinity of device 100 and configured to communicate with device 100 wirelessly (e.g., via a PAN, such as Bluetooth). When operating in an MS-assisted mode or an MS-based mode, however, device 100 may be configured to communicate over a radio access network 130 (e.g., UMTS radio access network) with a remote computer 132 (e.g., a location determination entity (PDE), a location proxy server (LPS) and/or a mobile positioning center (MPC), etc.).

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 100 may be configured to determine its position using acquisition data or other wireless data from the remote computer 132. The acquisition data may be provided periodically. In various implementations, device 100 and the remote computer 132 may be configured to communicate according to a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting the mobile computing device 100, the remote computer 132 may handle various processing operations and also may provide information to aid location determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, and so forth.

In various implementations, the position assist data provided by the remote computer 132 may improve the speed of satellite acquisition and the probability of a position fix by concentrating the search for a GPS signal and/or may improve the accuracy of location determination. Each position fix or series of position fixes may be available at device 100 and/or at the remote computer 132 depending on the location determination mode. In some cases, data calls may be made and position assist data may be sent to device 100 from the remote computer 132 for every position fix (e.g., in an ad hoc mode). In other cases, data calls may be made and position assist data may be sent periodically and/or as needed.

In various embodiments, device 100 may comprise dedicated hardware circuits or structures, or a combination of dedicated hardware and associated software, to support location determination. For example, the transceiver module 120 and the antenna system 122 may comprise GPS receiver or transceiver hardware and one or more associated antennas coupled to the radio processor 104 to support location determination.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 100 or from a source external to device 100. For example, the user of device 100 may interact with a data input device to command the LBS application to send a location request. The LBS application also may send a location request in response to receiving input from an external network element or computing device that is attempting to locate the user of device 100. In some cases, the LBS application also may be configured to automatically, periodically, and/or autonomously send location requests.

Although other applications may operate without regard to the location of device 100, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

The radio processor 104 may be configured to receive location requests from an LBS API handler on host processor 102 and may forward location responses to the LBS API handler for delivery to the LBS application through the LBS API. Radio processor 104 may be configured to communicate securely over a network with remote computer 132 (e.g., PDE, LPS or MPC) configured to provide authentication and authorization services and/or a variety of geo-services. For example, radio processor 104 may be configured to communicate with a PDE configured to verify privacy for location requests, allow authorized access to a location server, and provide various location server services. Radio processor 104 also may be configured to communicate with a PDE to request and receive geo-service information. Examples of geo-service information may include mapping information, routing information, geo-coding and reverse geo-coding information for addresses and coordinates, POI information, and so forth.

Radio processor 104 may be configured to invoke a position fix by configuring a position engine and requesting a position fix. For example, a position engine interface on radio processor 104 may set configuration parameters that control the location determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 104 may comprise or implement a position engine such as a GPS engine. In various embodiments, the position engine may be configured to provide location determination capabilities for device 100. In some embodiments, the position engine may be implemented as software operating in conjunction with hardware (e.g., GPS receiver hardware) allowing device 100 to receive and process GPS satellites signals for location determination. In one embodiment, the position engine may be implemented as a QUALCOMM® gpsOne® engine.

In various implementations, the position engine may employ one or more location determination techniques such as GPS, CGI, CGI+TA, EFLT, TDOA, AOA, AFTL, OTDOA, EOTD, AGPS, GPS/AGPS, hybrid techniques, and so forth. The position engine also may be configured to operate in one or more location determination modes including a standalone mode, an MS-assisted mode, and an MS-based mode. The determined position information generated and/or obtained by the position engine generally may comprise any type of information associated with the location of device 100. Examples of position information may include, without limitation, current location, latitude, longitude, altitude, heading information, vector information such as horizontal and vertical velocity, sector-based position location, position fix information, position uncertainty, device orientation, and so forth.

Referring now to FIGS. 4-10, various embodiments of systems and methods for updating position assist data will be described. When device 100 receives a request for a position fix (e.g., from an LBS application, a user, or other requester), device 100 is configured to use the position assist data to calculate the position fix. If one or more of the position assist data are not up-to-date or "fresh," device 100 may need to update the data before responding to the request. Further, by keeping the coarse data as up-to-date as possible, requests for position fixes can be processed quicker. Device 100 may even be able to respond to a request for a position fix without a new position calculation depending on the freshness of the coarse data and the requirements of the position fix. The coarse data may be accurate enough to satisfy the needs of the request.

Almanac and ephemeris data are used by device 100 to assist in acquiring GPS satellite signals. Depending on the circumstances of device 100 at the time of the request for a position fix, the time required to update expired almanac and ephemeris data could be as much as fifteen minutes or more, whereas a delay of over a second or two can result in an undesirable user experience. Accordingly, one or more of the systems and methods described below may be implemented alone or together to keep the almanac, ephemeris, coarse and other position assist data as up to date as possible.

Figure 4:
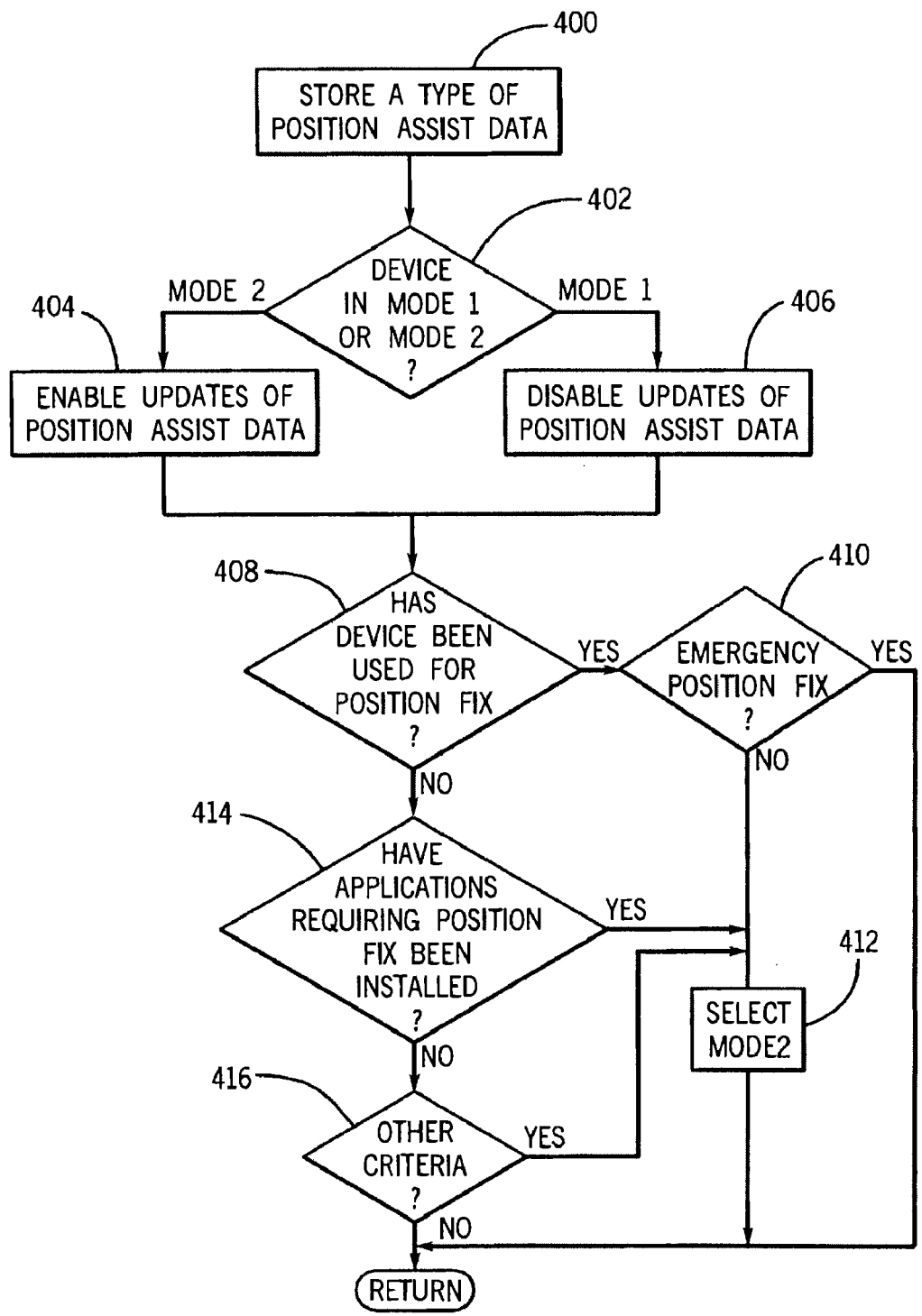
FIG. 4 is a flowchart illustrating a system and method for updating position assist data, according to an exemplary embodiment.

Referring to FIG. 4, device 100 is configured to determine the likelihood of a need for an update to position assist data. At step 400, device 100 is configured to store at least one type of position assist data (e.g., almanac, ephemeris, coarse, MS-assist, etc.). At step 402, device 100 determines whether it is in a first mode or a second mode. If device 100 is in a first mode (mode 1), updates of position assist data in an autonomous, or automatic manner, are disabled, as shown in step 406. A second mode, (mode 2) enables updates of position assist data, which may be done automatically, autonomously, periodically, without user input, etc., as shown at step 404. Step 402 can determine the mode of device with reference to a flag in non-volatile memory or by another mechanism. At step 408, device 100 determines whether it has been used for a position fix yet (e.g., since manufacture, since a hard reboot, since a soft reboot, etc.) and if it has, and (step 410) the position fix has not been due to an emergency position fix (e.g., E-911 service), at step 412 mode 2 is selected to enable updates of position assist data. At step 408, if device 100 has not been used yet for a position fix, device 100 determines whether applications requiring a position fix have been installed at step 414. If applications requiring a position fix have been installed, mode 2 is selected at step 412 to enable updates of position assist data. If not, other criteria may be checked at step 416. If the device has not been used for a position fix, and no applications requiring position fix have been installed in this embodiment, device 100 remains in mode 1, which disables updates of position assist data as shown in step 406. Alternatively, only one or two of steps 408, 410, 414, and 416 may be used to make the determination of whether to enable updates of position assist data.

As mentioned, device 100 may store a flag in non-volatile memory or other indication for whether device 100 has been used for a non-emergency position fix and/or whether or not any applications that might request position fixes have been installed on device 100. Until a flag is set under one of these circumstances, device 100 may remain in mode 1 to disable updates of position assist data, which may disable updates of some or all types of position assist data. In mode 2, position assist data may be updated in response to any number of different triggering events, such as, the initial determination to enter mode 2, a user input device, a request for position fix from an application or other user, and/or one or more of a variety of periodic, autonomous, or automatic triggers to update position assist data, such as those described herein below.

The determination of whether an application is of the type to request a position fix could be made by viewing a header file or a library file associated with the application, by having the device 100 or a user of device 100 manually test an application, by viewing a security level or certification data associated with the application (e.g., certified by a wireless carrier to request position fixes), by providing a prompt to a user to have the user select whether a newly-loaded application requires position fixes, by checking a profile associated with the application, or by other mechanisms. Device 100 may in an exemplary embodiment only be capable of identifying whether certain types of applications require position fixes, and may, therefore, make the determination of whether to stay in mode 1 only with respect to those applications. In this circumstance, device 100 may await a request for a position fix from an application before entering mode 2, even though the application is one which requires position fixes, since device 100 is incapable of identifying it as an application requiring position fixes.

Applications requiring a position fix may be a navigation application, a child finder application, other LBS applications, or other applications requiring a position fix, whether original equipment software or loaded subsequent to manufacture via a third-party application.

Figure 5:
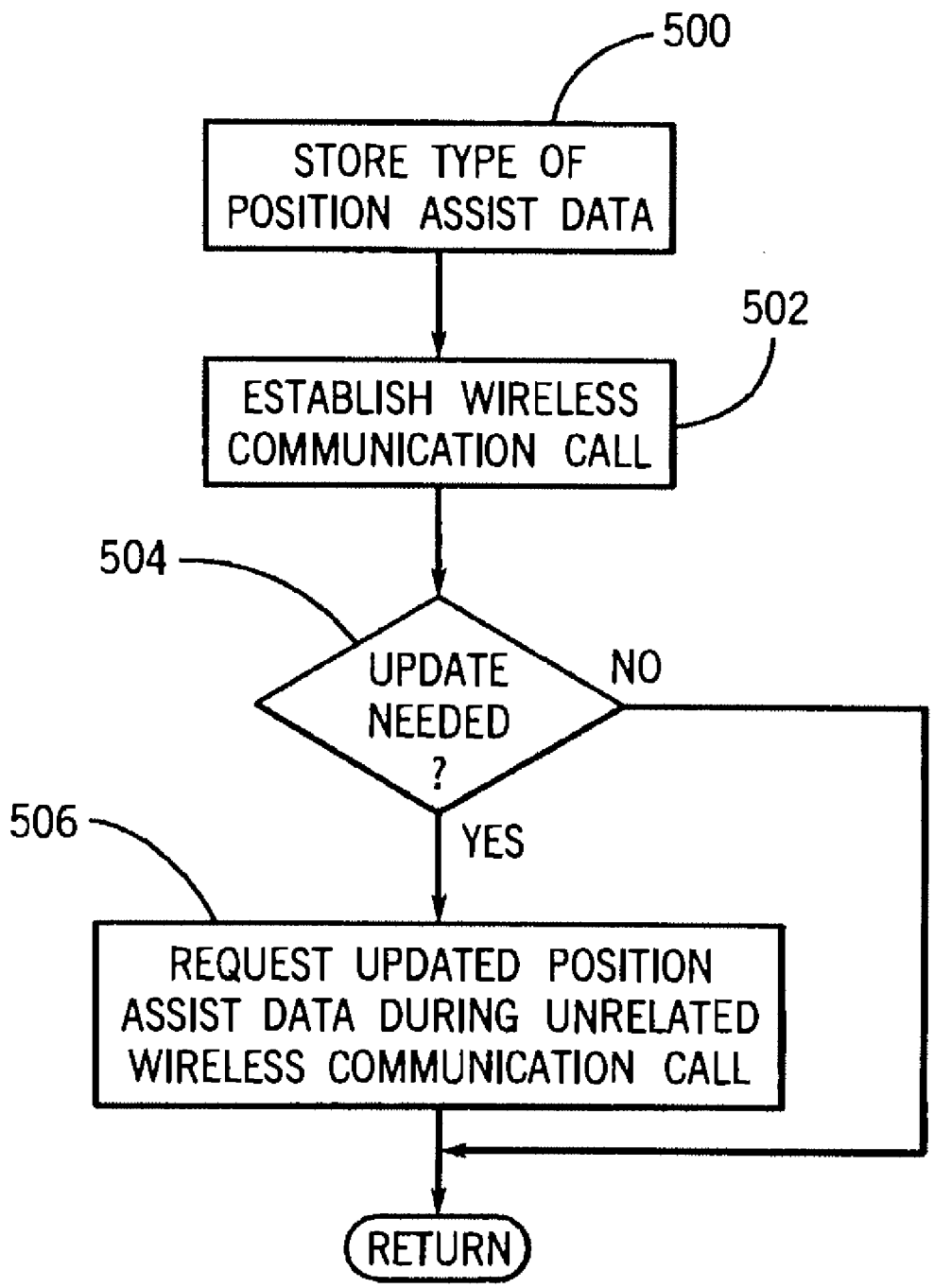
FIG. 5 is a flowchart illustrating a system and method for updating position assist data, according to an exemplary embodiment.

Referring now to FIG. 5, device 100 is configured to store at least one type of position assist data at step 500. At step 502, a wireless communication call is established which is unrelated to a request for position assist data, such as a telephone call or data communication call for email or other data communications. Device 100 is configured to communicate a request for updated position assist data for one or more of the types of position assist data during the wireless communication call, as shown at step 506. According to an alternative embodiment, at step 504, a determination of whether an update is needed can be made. The determination at step 504 can be made based on a time stamp associated with the type of position assist data stored in memory on device 100, which can be used by device 100 to derive a time period since the position assist data was last updated. Alternatively, or in addition, the determination at step 504 can be made based on a change in position of device 100, which may be determined as described herein with reference to FIG. 10.

In this embodiment, a request for position assist data from a wireless network is made during a wireless communication call established for another application. The position assist data can be interspersed with the voice and/or data communications received from the wireless network in a manner that appears transparent to a user of device 100. The request from device 100 and/or the data in response to the request from the wireless network can come before, after, or interspersed within the voice and/or data communications. The position assist data may be almanac, ephemeris, MS-assist data, or other position assist data.

In an exemplary embodiment, device 100 may determine that an update of a type of position assist data is needed and then may wait until a wireless communication connection or session has been set up for an unrelated purpose and then make the request for position assist data from the wireless network at that time. The request for position assist data can be "piggybacked" on the unrelated wireless communication and the responsive position assist data can likewise be "piggybacked" on the response signal. According to another exemplary embodiment, the request and/or responsive position assist data can be communicated on a control signaling data path, side band frequency, or other channel which may or may not be in use by the voice and/or data call which triggered the request for position assist data.

Figure 6:
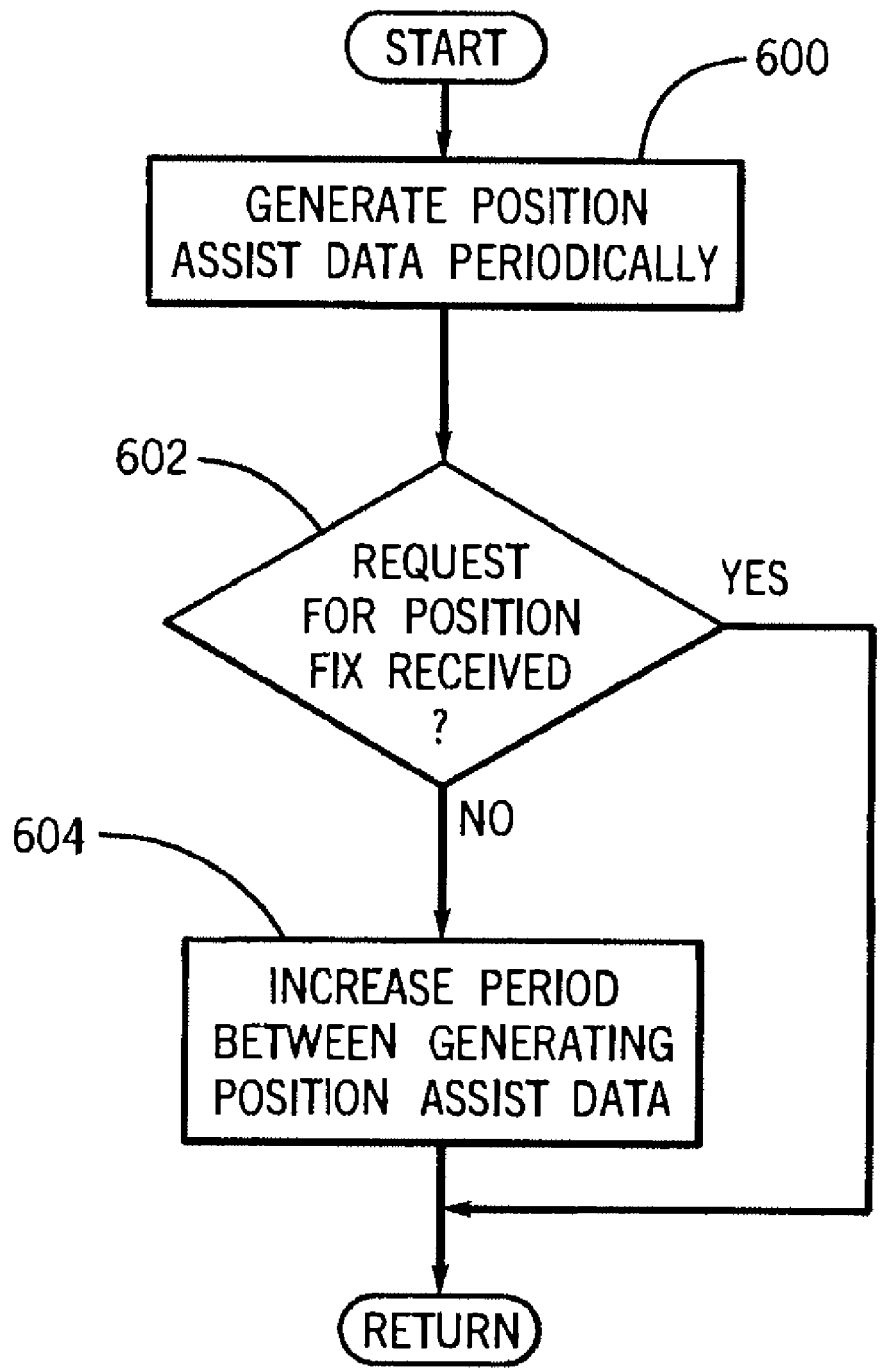
FIG. 6 is a flowchart illustrating a system and method for updating position assist data, according to an exemplary embodiment.

Referring now to FIG. 6, device 100 is configured to generate position assist data periodically at step 600. At step 602, if a request for a position fix is received, device 100 maintains the same period of generating position assist data. However, if a period of time X passes without receiving a request for a position fix, then the time period between generating additional position assist data is increased at step 604 by a period Y. In this embodiment, a processor of device 100 is configured to receive a request (e.g., internally from an application or externally from a user or other external application) for a position fix and to provide the position fix based on position assist data stored in memory. The processor may be configured to change the time period between subsequent steps of generating updated position assist data, for example, based on whether a subsequent request for position fix is received from a requester. In this embodiment, the processor is configured to increase the time period a plurality of times between each subsequent request for updated position assist data so long as no subsequent request for position fix is received. This may be referred to as a "throttling" algorithm or other algorithm which increases the time period between subsequent requests for position assist data so long as no request for a position fix is received from a requester.

According to one exemplary embodiment, device 100, after completion of a position fix, will periodically update one or more types of position assist data based on the assumption that there will likely be more position fixes in the near future. According to one embodiment, device 100 assumes that the likelihood of receiving requests for additional position fixes will decrease over time. Therefore, logic is used to determine how frequently to update the position assist data. For example, X minutes after a position fix, device 100 is configured to autonomously, automatically, or without user input, request a position assist data update (e.g., ephemeris data or calculation of coarse data). If a user or other requester has not requested another fix after X plus Y minutes from the last autonomous update of position assist data, device 100 is configured to automatically or autonomously request another update. After a period of time Z without receiving a request for a position fix, device 100 is configured to cease further automatic updates of position assist data according to this algorithm (but may resume requests for position fix data according to other triggering events, such as those described herein).

According to one exemplary embodiment, after a position fix is calculated, if no request for a position fix has been received within approximately 60 minutes, device 100 is configured to initiate a request for position assist data without user input. Device 100 is then configured to wait for two hours before autonomously generating additional position assist data for one or more of the position assist data types. Device 100 then may wait four hours (e.g., X=60 minutes plus $Y_{sub.1}$=4 hours), eight hours (e.g., X=60 minutes plus $Y_{sub.2}$=8 hours), etc. before subsequent generations of position assist data. The time periods are merely exemplary and may alternatively be on the order of minutes, days, etc.

According to one embodiment, the position assist data is coarse data and device 100 is configured to generate updated coarse data by generating an updated position fix. According to another embodiment, device 100 is configured to periodically generate updated coarse data without regard to whether a request for position fix is received, to compare a plurality of coarse data points, to determine that the device 100 is substantially stationary, and to cease generating further updated coarse data if the device is substantially stationary. In an exemplary embodiment, after comparing X successive position fixes, device 100 determines that it has not moved and subsequent coarse data updates are halted, unless an additional position fix is specifically requested by a user or requester or client. In this embodiment, power consumption can be reduced.

Figure 7:
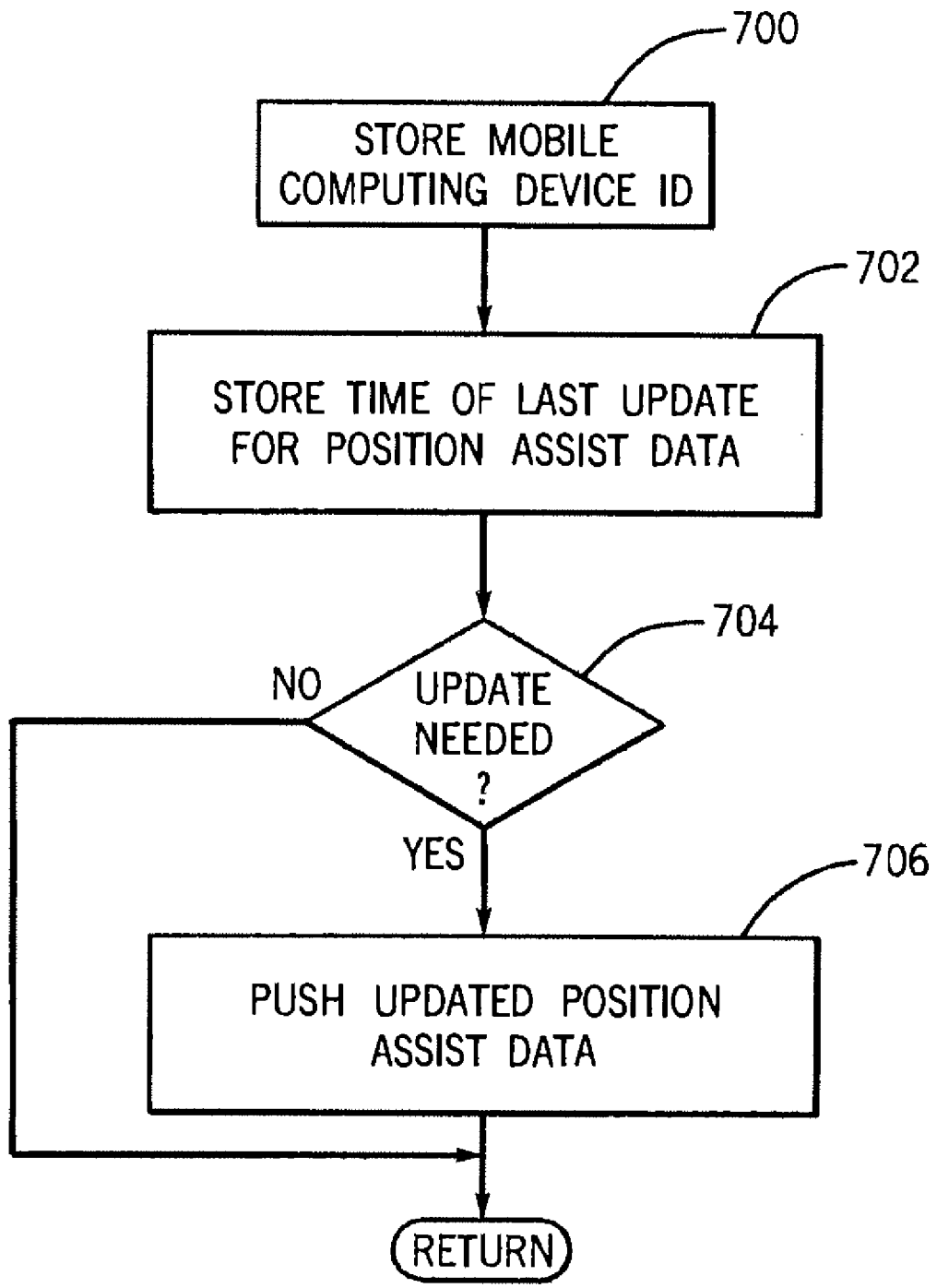
FIG. 7 is a flowchart illustrating a system and method for updating position assist data, according to an exemplary embodiment.

Referring now to FIG. 7, at step 700, a mobile computing device ID or other identifying information is stored at a server accessible via a wireless network. The server can be configured to maintain an account for a mobile device and to provide one or more services to the mobile device, such as, backup/restore features for personal information on device 100, lock/kill pill features to lock and/or clear the memory of device 100 should it be lost or stolen, activation and registration processes for various services, picture messaging, short messaging service (SMS) messaging, multi-media messaging service (MMS) messaging, and other services.

The server may further be configured to store a time of last update for one or more types of position assist data, as shown at step 702. For example, if almanac data is programmed into device 100 at the factory, then the date of manufacture will be used as the last almanac update time initially. The server computer can be configured to track when almanac data expires and to then trigger a "push" or other communication of updated almanac data over a wireless network to device 100. At step 704, the server determines whether an update is needed and, if so, updated position assist data is transmitted or pushed to a mobile device 100 at step 706. The push data for updated position assist data may be done via a data connection, an SMS, or other data downloads. According to one exemplary embodiment, the download of data can be timed during a low use period, such as at night or during a time in which part or all of the device is powered down. The server may further be configured to download the updated position assist data during an existing telephone or data call. The server may further be configured to download the updated position assist data in small portions. For example, the server would not need to track a time stamp of the last update if small chunks of data are periodically sent from time to time over a set time period, such as six months.

Figure 8:
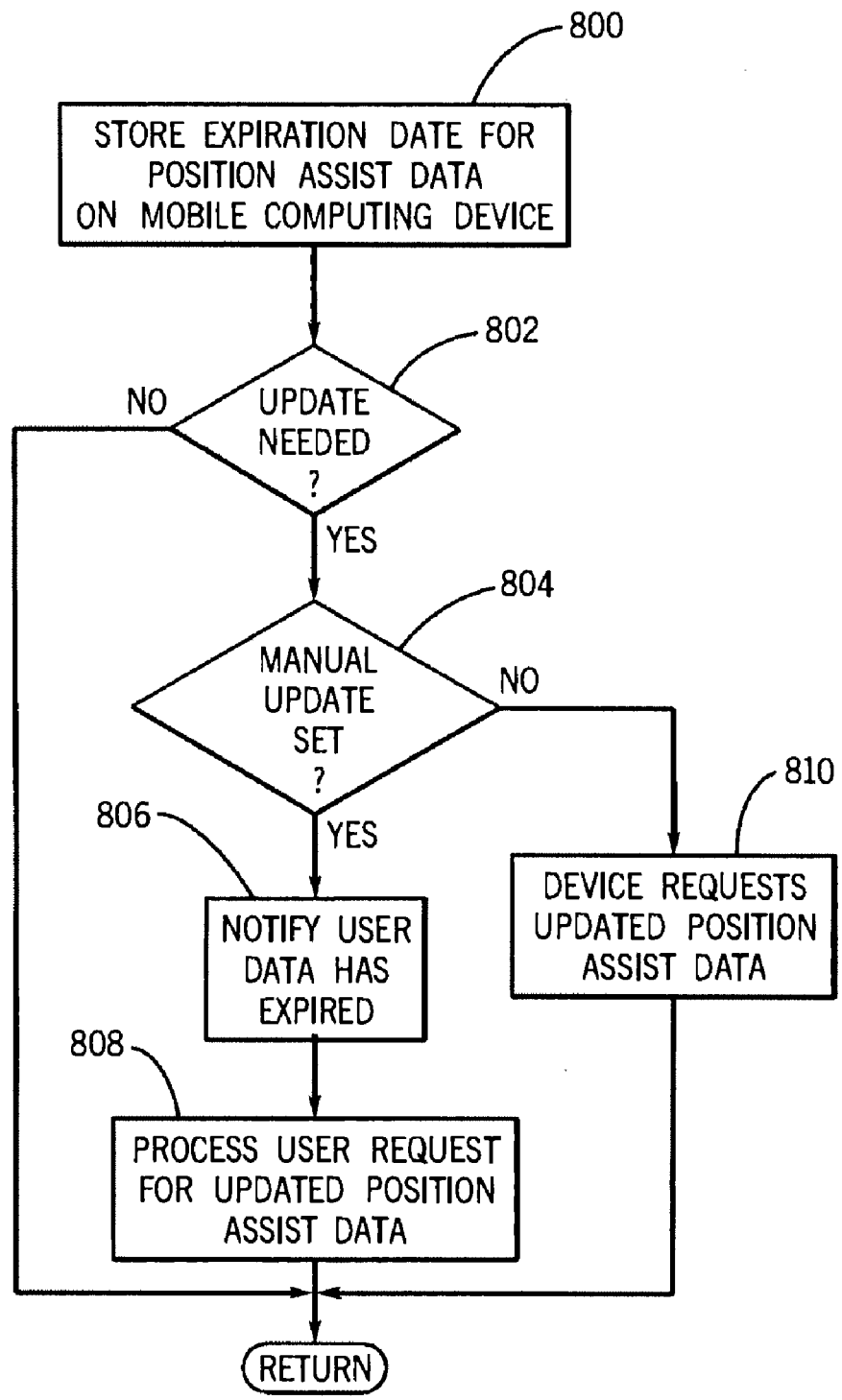
FIG. 8 is a flowchart illustrating a system and method for updating position assist data, according to an exemplary embodiment.

Referring now to FIG. 8, at step 800, device 100 is configured to store an expiration date for one or more types of position assist data. At step 802, device 100 is configured to determine whether an update is needed for one or more types of position assist data. For example, device 100 may maintain an expiration date for the position assist data and, upon expiration or reaching the time period for expiration, device 100 autonomously, automatically, or without user input, triggers a request to generate updated position assist data. Alternatively, at step 804 (which can be a process step or represent alternative embodiments), device 100 can determine whether it is configured for a manual update, in which case a user may be notified via the display, a chime, or other indication that one or more types of position assist data have expired. The user may then request via user input to device 100 updated position assist data as shown at step 808. Step 810 shows the scenario of an automatic request for an updated position assist data. In either event, the request may be sent via a wireless network to a position determination entity (PDE) or to a download server or by linking to a server via a universal resource locator (URL) that points to a location where position assist data may be downloaded (e.g., a U.S. Government website, etc). A user request for position assist data may also be accomplished by sending a text message, such as an SMS or mobile-originated-short message service (MO-SMS), by setting up a data connection to a PDE or another download server on a carrier's network, or by setting up a data connection to an established public site for almanac data (e.g., U.S. Government website, etc.).

According to another exemplary embodiment, device 100 may be configured to provide an indication to a user via the display or speaker (e.g., an icon, chime, tone, etc.) that device 100 is requesting and/or receiving updated position assist data. Advantageously, the user will then know that processing time is being spent on the operation, in the event that sluggish operation is caused for other applications or processes.

According to one exemplary embodiment, the download of position assist data may be by method of file transfer and may occur in portions of the complete file.

Figure 9:
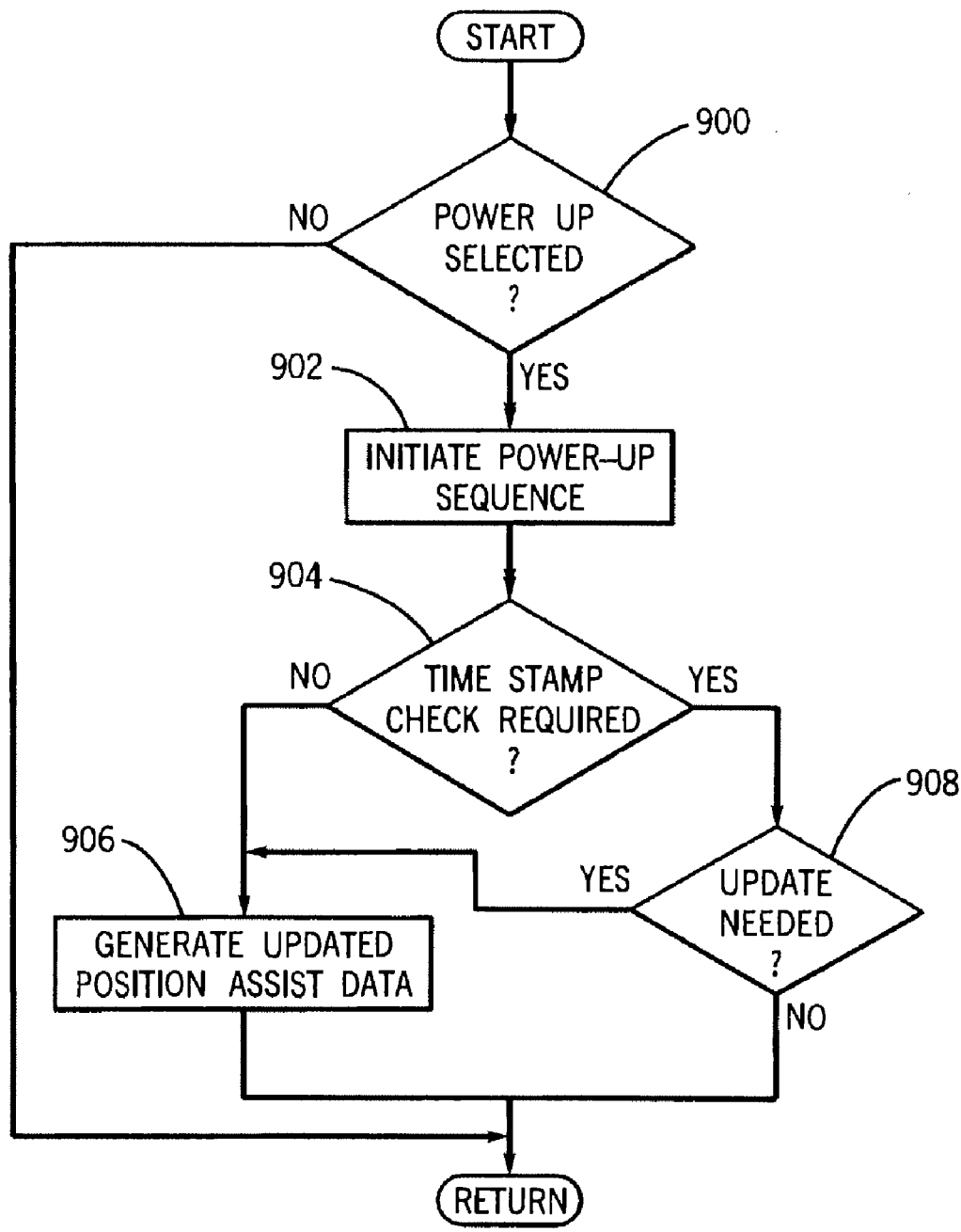
FIG. 9 is a flowchart illustrating a system and method for updating position assist data, according to an exemplary embodiment.

Referring now to FIG. 9, at a step 900, the device 100 detects that it has been powered up. At step 902, a power up sequence is performed, such as, powering up the processor or processors, enabling the display, etc. At step 904, if a time stamp check is not required (which may be a process step or represent alternative embodiments), updated position assist data is generated at step 906 automatically, autonomously, and/or without user input. The position assist data may be generated by sending a request for updated position assist data and/or by generating a new position fix to create new coarse data. If a time stamp check is required, at step 908 device 100 determines the period of time since the last update of the type of position assist data and if the period is beyond a predetermined threshold representing "fresh" position assist data, then the process proceeds to step 906 to generate updated position assist data.

According to one embodiment, every time device 100 is powered up, updated position assist data of at least one type is generated.

According to another embodiment, each time device 100 is powered up, position assist data of at least one type is automatically generated provided a time stamp associated with the data is greater than a predetermined time period representing "fresh" data.

According to one embodiment, coarse data may comprise a position fix, a time stamp indicating the time at which the position fix was calculated, and accuracy data indicative of the level of accuracy of the position fix, and/or other data.

Figure 10:
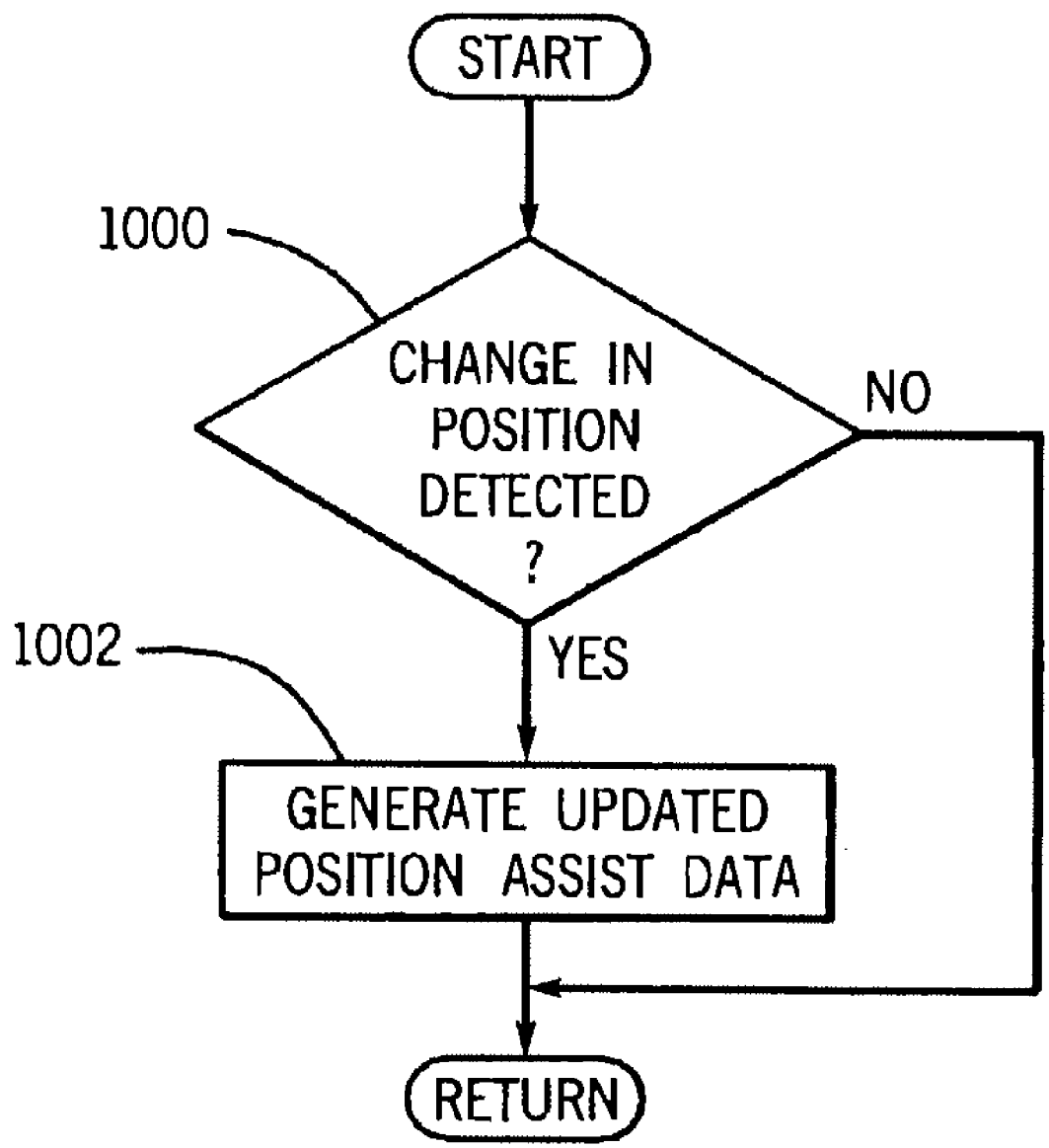
FIG. 10 is a flowchart illustrating a system and method for updating position assist data, according to an exemplary embodiment.

Referring now to FIG. 10, device 100 is configured to detect whether a change in position of device 100 has occurred at step 1000. If a change in position has been detected of sufficient significance (e.g., greater than a predetermined threshold, or data showing velocity and/or acceleration), at step 1002, updated position assist data is generated. Device 100 can be configured to detect an event that signals movement of device 100 (e.g., system ID/network ID (SID/NID), overhead message changes, base station (BS) latitude/longitude in overhead message changes beyond some threshold, etc.). Upon detecting this change, device 100 may be configured to automatically, autonomously, or without user input initiate or trigger a request for an update of position assist data.

Ephemeris data is different based on location. An indication of movement would indicate the possible need for an update of ephemeris data. According to one exemplary embodiment, device 100 is configured to determine whether it moved within 30, 60, 90 minutes or some other predetermined period of time and, if so, the time period of which the position assist data is considered "fresh" or useable may be decreased or reduced to zero. Alternatively, if device 100 indicates that it has not moved, device 100 may be configured to not update the position assist data for the entire predetermined period of time, whether it be 30, 60, 90 minutes or some other period of time.

In alternative embodiments, geographic designations other than SID/NID may be used, such as a cellular base station site region, a circular, square or other shaped region with predetermined parameters, etc.

Further, while data may be received from an overhead message, such as a signaling message provided continuously to a mobile device over a wireless network regardless of whether a data or telephone communication session has been established, the SID/NID or BS latitude/longitude may be provided over any communication signal. For example, device 100 may configured to receive such an overhead message at very short intervals, such as milliseconds, tenths of seconds, or seconds. The change in position of the device may further be determined by calculating position fixes, such as a stand alone, MS-assist, MS-based, PDE-based, or other position fix.

With reference to the disclosure and claims, use of the phrase "based on" means "based in least in part on," and use of the term "a" or "an" means "one or more" or "at least one." Further, any of the steps of any of the methods disclosed herein may be combined with any of the other steps and/or rearranged with other steps in alternative embodiments. Specifically, various embodiments may make use of different combinations of parts or all of the methods disclosed herein.

While the exemplary embodiments illustrated in the Figs., and described above are presently exemplary, it should be understood that these embodiments are offered by way of example only. For example, while some embodiments are shown with reference to receiving position assist data over a wireless network, the teachings herein may also be applied to receiving position assist data from GPS satellites, FM or AM radio signals, other wireless transmissions, wired connections, etc. Accordingly, the present invention is not limited to a particular embodiment, but extends to various modifications that nevertheless fall within the scope of the appended claims.

What is claimed is:

1. A mobile computing device, comprising:
a memory to store at least one type of position assist data, the memory to store updated position assist data for the type of position assist data;
a transceiver for wireless communication; and
a location based services application stored on the memory to operate in a first operating mode in which the type of position assist data is not updated and operate in a second operating mode in which the type of position assist data is updated in response to at least one triggering event received by the transceiver, the location based services application to receive a request for a position fix, and switch from the first operating mode to the second operating mode in response to the request for a position fix.

2. The mobile computing device of claim 1, the location based services application to periodically update the type of position assist data when in the second operating mode.

3. The mobile computing device of claim 1, the location based services application to update the type of position data using a data call established by the transceiver when in the second operating mode.

4. The mobile computing device of claim 1, the type of position data comprising almanac data.

5. A mobile computing device, comprising:
a transceiver to establish a wireless communication call;
a processor communicatively coupled with the transceiver; and
a memory communicatively coupled with the processor, the memory to store (i) at least one type of position assist data, (ii) updated position assist data for the type of position assist data, and (iii) a location based services application,
the location based services application to (i) operate in a first operating mode in which the type of position assist data is not updated and operate in a second operating mode in which the type of position assist data is updated in response to at least one triggering event received by the transceiver, (ii) receive a request for updated position assist data for a type of position assist data during the wireless communication call, and switch from the first operating mode to the second operating mode in response to the request for updated position assist data,
the processor to communicate the request for updated position assist data based on a time period since the position assist data was last updated.

6. The mobile computing device of claim 5, the location based services application to communicate the request for updated position assist data during a data call.

7. The mobile computing device of claim 5, the location based services application to communicate the request for updated position assist data on a periodic basis.

8. The mobile computing device of claim 5, the type of position assist data comprising almanac data.

9. The mobile computing device of claim 5, the type of position assist data comprising ephemeris data.

10. The mobile computing device of claim 5, the type of position assist data comprising mobile station-assist data.

11. A mobile computing device, comprising:
a memory to store at least one type of position assist data and updated position assist data for the type of position assist data; and
a processor communicatively coupled with the memory, the processor to receive a request for a position fix from a requester and to provide the position fix based on the position assist data in response to the request, and generate updated position assist data a predetermined time period after the position fix is provided,
wherein in a first operating mode, the position assist data is not updated and in a second operating mode, the position assist data is updated in response to at least one triggering event received by the processor, and switching from the first operating mode to the second operating mode in response to the request for a position fix.

12. The mobile computing device of claim 11, the processor to periodically generate updated position assist data.

13. The mobile computing device of claim 11, the updated position assist data comprising almanac data.

14. The mobile computing device of claim 11, the position assist data comprising coarse data and the processor to generate the updated coarse data by generating an updated position fix.

15. The mobile computing device of claim 11, comprising a transceiver communicatively coupled with the processor, the transceiver to communicate the request for a position fix during a data call.

16. The mobile computing device of claim 11, the position assist data comprising ephemeris data and the processor to generate the updated position assist data by receiving the ephemeris data via a transceiver.

* * * * *